Figure 1:
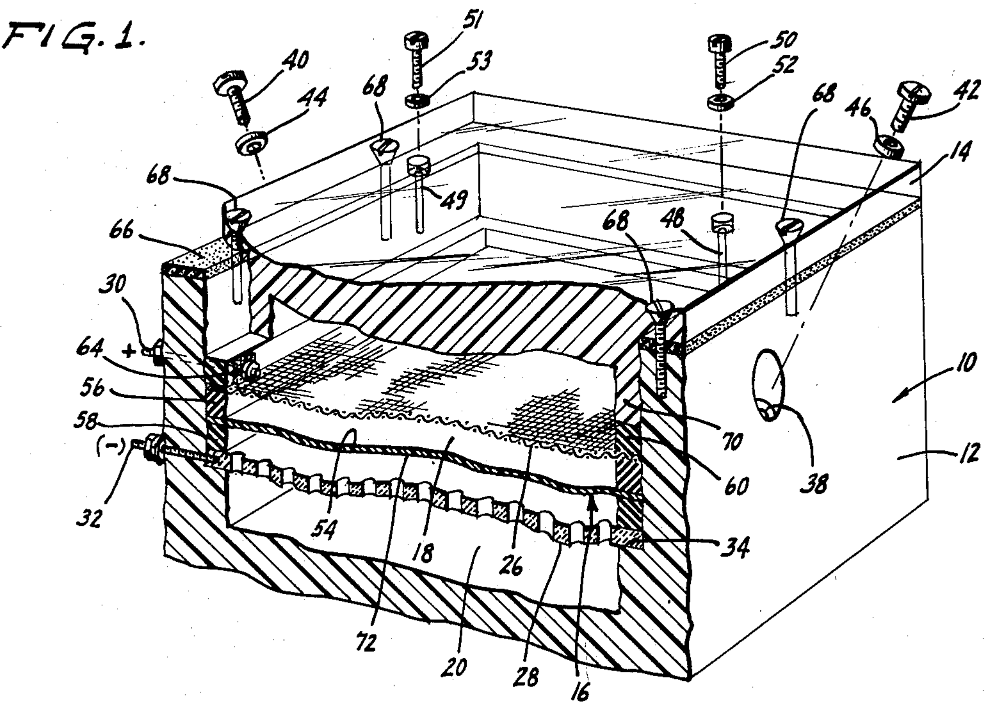

Dec. 17, 1963 S. ZAROMB 3,114,658

ELECTRIC CELL

Filed Oct. 22, 1959

INVENTOR.
SOLOMON ZAROMB

BY

Herbert Epstein

AGENT

United States Patent Office 3,114,658

Patented Dec. 17, 1963

3,114,658

ELECTRIC CELL

Solomon Zaromb, Philadelphia County, Pa., assignor, by mesne assignments, to Philco Corporation, Philadelphia, Pa., a corporation of Delaware Filed Oct. 22, 1959, Ser. No. 848,030
10 Claims. (Cl. 136—6)

This invention relates to electric cells for the production of electrical energy by chemical action. More particularly it relates to improved electric cells capable of being recharged both by exposure to radiant energy and by application thereto of an electric recharging current. It also relates to improved means for inhibiting within said cells reactions tending to render such cells ineffective even though no electrical energy has been withdrawn therefrom.

In co-pending patent application, Serial No. 809,219, filed April 27, 1959, by Marvin E. Lasser and Solomon Zaromb and entitled "Electrical Apparatus," a novel electric storage cell is described and claimed which is rechargeable both electrically and by radiant energy. In one form this cell comprises two electrodes (silver and carbon) immersed in an electrolyte (aqueous ferric chloride). When a load is connected between the silver and carbon electrodes, a current flows therethrough, silver chloride is formed upon the silver electrode and the ferric chloride is converted to ferrous chloride. In accordance with that invention the cell is constructed and arranged so that the silver electrode is exposable or exposed to radiant energy (e.g. sunlight or emanations of a radioactive substance positioned adjacent the silver electrode). Upon such exposure, the silver chloride formed on the silver electrode during discharge is reconverted to silver and the ferrous chloride to ferric chloride, i.e. the cell is recharged. Alternatively the cell may be recharged by applying an appropriate charging potential between its terminals.

In order for the aforementioned cell to have a reasonably high charge-storage capacity, it is necessary that the ferric ions in the electrolyte have a relatively high concentration. However when such is the case the ferric ions corrode the silver electrode without producing electricity. To remedy this defect, means are provided in the cell for maintaining the concentration of ferric ions adjacent the silver electrode at a low value while permitting a high concentration of ferric ions to be present in the cell. As described in the said application, these means may comprise a membrane dividing the cell into two compartments and permeable substantially only to anions and water. One compartment contains an electrolyte having only a low concentration of ferric ions while the other compartment contains an electrolyte having a high concentration of ferric ions. The silver electrode is immersed in the former electrolyte and the carbon electrode is immersed in the latter electrolyte. Because of the membrane, the ferric ions in the compartment containing the carbon electrode cannot reach the silver electrode and the latter electrode is protected from corrosion. Nonetheless the ferric ions are available at the carbon electrode to supply electrical energy to an external load connected between the terminals of the cell.

However, because the semipermeable membrane is substantially impermeable to cations, the cell cannot be recharged fully by radiation unless a third electrode is inserted in the electrolyte containing the silver electrode and is connected to the carbon electrode in the other electrolyte, thereby providing a conductive path over which electrons can flow from one electrolyte to the other. The need for this electrode, which is typically made of platinum, makes this type of cell more expensive and its construction more complex than a two-electrode cell.

In another form of the Lasser-Zaromb cell the means for maintaining the concentration of ferric ions at a low value adjacent the silver electrode comprise a membrane permeable substantially only to cations and water. These means also comprise a substance, e.g. phosphoric acid, included in the electrolyte containing the carbon electrode (into which a high concentration of ferric ions is initially placed) which selectively reacts with ferric ions but not ferrous or hydrogen ions to form an anion, i.e. a ferric-phosphate complex, to which the membrane is substantially impermeable. Hence, by being complexed, the ferric ions are prevented from migrating into the electrolyte containing the silver electrode, whereas by contrast ferric ions contained in the latter electrolyte tend to migrate through the membrane into the electrolyte containing the phosphate ions. There they are trapped by being complexed. As a result the electrolyte containing the silver electrode has only a low ferric ion concentration.

When the latter cell is recharged radiatively, ferrous ions adjacent the silver electrode are converted to ferric ions. To complete the recharging process these ferric ions must then migrate through both the electrolyte containing the silver electrode and the cation-permeable membrane, into the other electrolyte. Because these ferric ions must travel a relatively long distance, primarily by diffusion, the rate of recharging of the cell tends to be relatively low. Moreover, so long as these ferric ions remain in the electrolyte containing the silver electrode, they tend to corrode it without however yielding electrical energy.

Accordingly an object of my invention is to provide an improved electric cell which generates electrical energy by chemical action and which is responsive to radiant energy to be recharged.

Another object is to provide an improved electric cell which is responsive to radiant energy from a source external to the cell, such as sunlight, to recharge it.

Another object is to provide an improved electric cell which is capable of being recharged by radiant energy at a useful rate and also is capable of storing electrical energy for a substantial length of time.

Another object is to provide an improved electric cell in which parasitic reactions tending to reduce the energy-storage capacity of the cell are inhibited.

Another object is to provide an improved electric cell which is rechargeable by radiant energy even though it has only two electrodes.

To achieve the foregoing objects an electric cell is provided which comprises first and second electrolytes respectively containing first and second substances, charge-conductive means separating said electrolytes from each other, and first and second electrodes respectively immersed in said first and second electrolytes. This cell is capable of producing electrical energy through the conversion of said first and second substances to third and fourth substances respectively. In accordance with the invention the charge-conductive means comprise a substance responsive to radiant energy incident thereon to interact with said third and fourth substances to re-form said first and second substances respectively and thereby recharge the cell. To permit recharging of the cell by radiant energy, the container and electrodes of the cell are constructed and arranged so as to admit radiant energy to said charge-conductive means, and to make feasible recharging by radiant energy at a useful rate as well as storage of this charge for substantial length of time, the charge-conductive means include means inhibiting the transfer of said first and third substances into said second electrolyte and said second and fourth substances into said first electrolyte.

Figure 2:
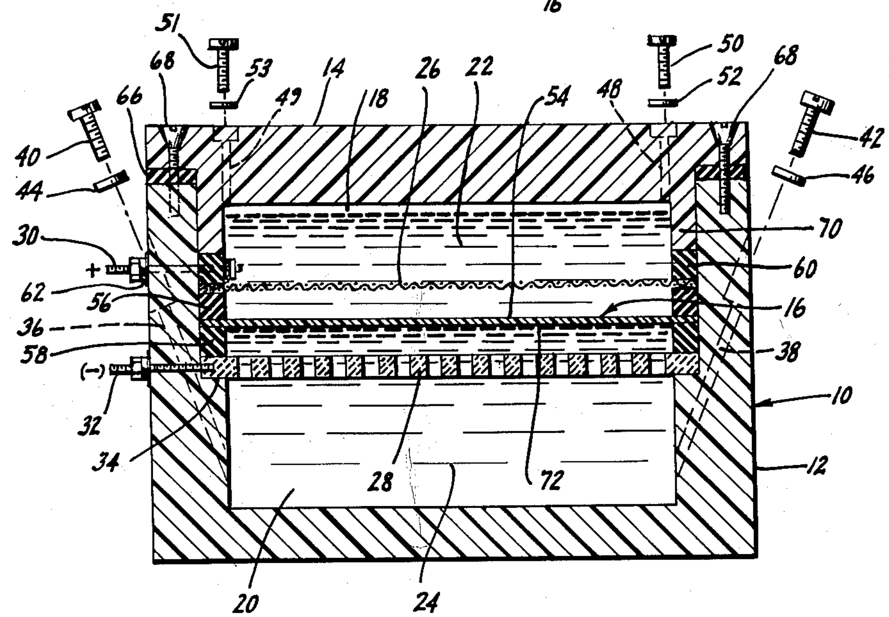

The invention will be understood more fully from a consideration of the following description taken in connection with the accompanying drawings in which FIGURES 1 and 2 illustrate in perspective and cross-sectional views a cell according to the invention.

Referring to the drawings, the novel cell there illustrated comprises a container 10 including a receptacle 12 and lid 14 each composed of an insulating material. Lid 14 is transmissive of visible light and preferably also of ultra-violet light. Charge-conductive means 16 separate the interior of receptacle 12 into two compartments 18 and 20 respectively. Upper compartment 18 is partially filed with a first electrolyte 22 and lower compartment 20 is entirely filled with a second electrolyte 24. A first electrode 26 is immersed in electrolyte 22, and a second electrode 28 is immersed in electrolyte 24. Electrolytes 22 and 24 respectively contain first and second substances which, upon connection of a load between electrodes 26 and 28, are respectively converted to third and fourth substances. As a result of these conversions the cell supplies electrical energy to the load.

In accordance with the invention charge-conductive means 16 comprise a substance which is responsive to radiant energy incident thereon to interact with said third and fourth substances to re-form the first and second substance respectively and thereby to recharge the cell. Because means 16 is positioned in intimate physical contact with both electrolytes, the radiant-energy-responsive substance therein is able to act concurrently on the third and fourth substances without the use of additional electrodes or the migration of ions from one electrolyte to the other. As a result the conversion of radiant energy into chemical energy by the cell tends to be more efficient and more rapid than in the Lasser-Zaromb cell described above. To allow radiant energy, e.g. sunlight, incident on lid 14 freely to impinge on means 16, electrode 26 is constructed so as to be highly translucent. In the form shown in the drawing it is composed of screening. In addition, to prevent any substantial intermixing of the active substances contained in the respective electrolytes, means 16 is constructed to be substantially impermeable thereto. As a result the cell is able to store for substantial lengths of time the energy acquired by irradiation of means 16. Screw terminals 30 and 32 afford electrical connection to electrodes 26 and 28 respectively.

In one specific embodiment of the invention receptacle 12 and lid 14 are composed of an electrically insulating, translucent plastic such as polystyrene. Receptacle 12 comprises an interior shelf 34 upon which electrodes 26 and 28 and charge-conductive means 16 are supported. In addition it comprises ducts 36 and 38 for use in inserting electrolyte 24 into lower compartment 20 after assembly of the cell. Ducts 36 and 38 are closable by means of screws 40 and 42 and compressible washers 44 and 46 composed of substances chemically inert in electrolyte 24. Lid 14 comprises ducts 48 and 49 which are respectively closable by screws 50 and 51 and compressible washers 52 and 53, all of which are composed of substances chemically inert in electrolyte 22. First electrode 26 is constructed of platinum screening, which is inert in electrolyte 22, and second electrode 28 is constructed of carbon, which is inert in electrolyte 24. Electrode 28 is perforated to permit electrolyte 24 to pass therethrough.

Electrolyte 22 initially consists essentially of aqueous hydrochloric acid having a concentration of about 0.1 molar. Electrolyte 24 initially consists essentially of an aqueous solution of hydrofluoric acid, ferric chloride and ferrous chloride, having respective concentrations of about 0.02 molar, about 0.05 molar and about 0.01 molar.

In accordance with the invention charge-conductive means 16 comprise a sheet of substantially monocrystalline silver chloride about 0.002 inch thick. The latter sheet is substantially impermeable to the ions present in electrolytes 24 and 26 and, as discussed more fully hereinafter, is responsive to light falling upon its surface 54 to recharge the cell.

In assembling the cell, carbon electrode 28 is positioned on shelf 34. Silver chloride sheet 16, sandwiched between a pair of chemically inert, compressible insulating spacers 56 and 58 composed for example of rubber, is positioned atop electrode 28. Platinum electrode 26 is positioned atop spacer 56 and a compressible insulating spacer 60 is positioned atop this electrode. Terminal screw 30 is passed through holes appropriately positioned in receptacle 12, spacer 60 and a tab integral with platinum electrode 16, and is secured to the tab and container by nuts 62 and 64. Nut 64 and the portion of screw 30 within receptacle 12 are then coated protectively with a substance, e.g. polystyrene, chemically inert in electrolyte 22.

Screws 40 and 42 are now removed from ducts 36 and 38 in receptacle 12 and screws 50 and 51 are removed from ducts 48 and 49 in lid 14. A compressible gasket 66 is positioned atop receptacle 12 and lid 14 is secured thereto by means of screws 68. As shown in the drawing lid 14 comprises a projection 70 dimensioned so as to compress slightly spacers 56, 58 and 60 when lid 14 is secured to receptacle 12 by screws 68. This compressive action serves to hold the electrodes and the silver chloride sheet rigidly in position and to render compartments 18 and 20 liquid-tight. Then electrolyte 24 is poured through one of ducts 36, 38 into lower compartment 20 until enough electrolyte has been added to contact the lower surface of sheet 16. Thereafter electrolyte 22 is added via one of ducts 48, 49 to upper compartment 18. Finally screws 40, 42, 50 and 51 are reinserted into ducts 36, 38, 48 and 49 respectively.

To condition the cell to supply electrical energy, the cell is initially charged either by supplying an appropriate charging current thereto, i.e. by connecting the positive pole of a source of charging current to electrode 30 and the negative pole thereof to electrode 32. Alternatively and in accordance with the invention this charging may be accomplished by irradiating silver chloride sheet 16, e.g. with sunlight transmitted through lid 14 and electrode 26. In response to this sunlight, chloride ions at the surface 54 of sheet 16 adjoining electrolyte 22 are converted into chlorine, and silver ions in sheet 16 are converted into silver atoms. These silver atoms diffuse through the thin silver chloride sheet to the surface 72 thereof adjoining electrolyte 24, and there react with the ferric ions contianed in that electrolyte to form ferrous chloride. In the course of this reaction the metallic silver atoms are oxidized to silver ions.

After the cell has received its initial charge, either electrically or by irradiation, it is ready to deliver electrical energy to a load connected betweeen its terminals 30 and 32. In the cell described above, terminal 30 is the positive terminal and terminal 32 the negative terminal. By connecting a load (not shown) between these terminals electrical energy is withdrawn from the cell. This electrical energy is produced by the release of electrons to electrode 28 by ferrous ions present in electrolyte 24, by the passage of these electrons through the load to electrode 26 and by the uptake of these electrons at electrode 26 by chlorine present in electrolyte 22. In this discharge process the ferrous ions in electrolyte 24 participating in the reaction are converted into ferric ions, and the chlorine atoms in electrolyte 22 participating in the reaction are converted into chloride ions. The electric circuit is completed through the cell by silver ions travelling through silver chloride sheet 16 from surface 72 to surface 54.

After the electrical energy stored within the cell has been withdrawn therefrom, the cell may be recharged either by exposing sheet 16 to radiation or by supplying an appropriate charging current to the cell in conventional manner. If desired both charging processes may be employed simultaneously. Since the reactions occurring on recharging are identical to those occurring on initial charging, no further discussion thereof is deemed necessary.

The invention is by no means limited to the specific charge-conduction means 16 or the specific electrolytes 22 and 24 set forth in the preceding example. Thus in another cell according to the invention electrolyte 22 initially consists essentially of one molar aqueous hydrochloric acid, and electrolyte 24 initially consists essentially of an aqueous solution of one molar hydrochloric acid saturated with cuprous chloride. Charge-conductive means 16 comprise a sheet of monocrystalline silver chloride having the surface thereof to be irradiated, i.e. surface 54, coated with silver bromide and silver iodide. The latter coating may be formed by applying a mixture of 0.05 molar hydrobromic acid and 0.005 molar hydriodic acid to surface 54 for 30 minutes. The silver bromide and silver iodide coating thus formed on surface 54 of the silver chloride sheet enhances its photosensitivity. Alternatively sheets of either of the latter materials or of mixtures thereof may be substituted for the silver chloride sheet.

The operation of the latter cell is similar to that of the cell described in the first example, differing therefrom only in that copper instead of iron ions are oxidized during discharge and reduced during charge of the cell. Accordingly no further discussion thereof is deemed necessary.

It is unnecessary that the photoresponsvie substance of charge-conductive means 16 be monocrystalline. On the contrary this substance may be part of a polycrystalline sheet or may be impregnated into a membrane. The latter arrangement is particularly desirable because the membrane can be made substantially thinner than can a sheet of silver halide, without reducing its mechanical strength or durability below permissible levels. This increased thinness is highly desirable because it shortens the path that charge carriers must move within means 16, and hence lowers the resistivity of the cell and increases its charging rate. However because membranes, unlike the silver halide sheets, tend to have a slight permeability to ions present in the electrolytes, it is desirable to provide additional means further to inhibit ion transfer therebetween. One such means are ions which are so large as to be unable to pass through the membrane when placed in one of the electrolytes and which have a polarity opposite that of the ions in that electrolyte undergoing reduction and oxidation in the charging and discharging of the cell. These large ions form a charged layer on the surface of the membrane adjoining the electrolyte containing them. This charged layer acts electrostatically to inhibit the aforementioned ions of opposite polarity from migrating through the membrane. Where such large ions are employed, it is preferable that the concentration of smaller ions of the same polarity as the large ions be relatively low.

In a specific cell employing a membrane and large ions, means 16 comprise a cation-exchange membrane impregnated with silver bromide and silver iodide. Typically this cation-exchange membrane comprises a polystyrene matrix having sulfonic acid groups linked thereto. It is impregnated with silver bromide and silver iodide by applying an aqueous solution consisting essentially of 0.001 to 0.01 molar hydriodic acid and 0.1 to 0.25 molar hydrobromic acid to the side of the membrane eventually to be irradiated and by concurrently applying to the opposite side of the membrane a 0.1 molar solution of silver nitrate. The latter treatment is preferably continued for between about 3 and 30 days.

Electrolyte 22 initially consists essentially of hydrochloric acid having a concentration of between about 0.01 and about 0.1 molar. Electrolyte 24 consists essentially of an alkyl aryl metal sulfonate, e.g. dodecyl benzene sodium sulfonate, equilibrated with an aqueous solution of silver oxide, ferrous sulfate, ferric sulfate, and sulfuric acid. This equilibration may be performed by applying to one surface of a cation-exchange membrane a quantity, e.g. 45 milliliters, of an aqueous solution containing about 25.5 percent by weight of dodecyl benzene sodium sulfonate and about 4.5 percent by weight of sodium sulfate (Ultrawet 30DS, manufactured by the Atlantic Refining Company, Philadelphia, Pennsylvania), and by applying to the opposite surface of this membrane, about 1 liter of an aqueous solution consisting essentially of 0.01 molar silver oxide, 0.2 molar ferrous sulfate, 0.1 molar ferric sulfate and 0.1 molar sulfuric acid. The treatment is continued for about one to three days. By reason of the concentration gradients of the various cations across the membrane much of the sodium ion present in the dodecyl benzene sodium sulfonate solution diffuses into the electrolyte on the other side of the membrane and is replaced by silver, ferrous and ferric and hydrogen ions diffusing into the solution containing the sulfonate compound. In addition much of the sodium sulfate also diffuses out of the sulfonate solution into the other electrolyte. To displace further the sodium ions from the sulfonate compound and to replace them with silver, ferrous, ferric and hydrogen ions, five cubic centimeters of the aqueous solution composed of silver oxide, ferrous and ferric sulfates and sulfuric acid is mixed into the sulfonate solution and the mixture is then applied to one surface of a cation-permeable membrane having a large quantity (1 liter) of distilled water applied to its other surface. This treatment is continued for two to six days. The resultant sulfonate solution is used as electrolyte 24.

In accordance with the invention the dodecyl benzene sulfonate anions present in electrolyte 24 are too large to pass through membrane 16. Accordingly they form a negatively-charged layer on surface 72 thereof which substantially prevents the ferrous, ferric, silver or hydrogen ions in electrolyte 24 from passing therethrough into electrolyte 22. In response to illumination membrane 16 charges this cell in a manner similar to that described above in the first example. The discharge reaction of the cell is also similar to that of the first-described cell.

Where even greater isolation of the ions in electrolyte 22 and 24 is desired in a cell employing a membrane, charge-conductive means 16 may be constructed of a pair of membranes positioned contiguous one another. In such an arrangement one of the membranes is an anion-exchange membrane while the other is a cation-exchange membrane. The electrolyte adjoining the cation-exchange membrane contains anions whose ionic size is such that they cannot pass through this membrane, while the electrolyte adjoining the anion-exchange membrane contains cations whose ionic size is such that they cannot pass through the latter membrane. At least the illuminated membrane is impregnated with a photosensitive substance, e.g. silver chloride, silver bromide and/or silver iodide, which renders it photochemically responsive.

In operation the large cations form a positively-charged layer on the surface of the anion-exchange membrane which by electrostatic attraction substantially prevents the transfer of anions therethrough. Similarly the large anions form a negatively-charged layer on the surface of the anion-exchange membrane which by electrostatic attraction substantially prevents the migration of cations therethrough.

Where even greater isolation of the ions in the two electrolytes is desired, a thin layer of distilled water may be positioned between the anion- and cation-exchange membranes discussed above.

Although the foregoing membrane systems employed to isolate the ions in the respective electrolytes have been described as embodied in light-responsive electric cells according to the invention, it is clear that such membranes can be used in non-light-responsive electric cells employing two electrolytes at least some of whose ions must be kept out of the adjoining electrolyte. For example such membrane systems are usable in the "redox" type of fuel cell to keep ions in the separate chambers thereof from mixing with one another.

While the specific light-responsive cell described above is one constructed to recharge in response to light incident on lid 14 it will be understood that this cell can be recharged by applying other forms of radiant energy to means 16, e.g. ultra-violet light, X- or gamma-radiation. Moreover the source of radiation may be included within the cell.

In addition the photosensitive material present in charge-conductive means 16 need not be a silver halide. It may alternatively comprise a photosensitive dye or other photoreactive substance.

While I have described my invention by means of specific examples and in a specific embodiment, I do not wish to be limited thereto, for obvious modification will occur to those skilled in the art without departing from the scope of my invention.

What I claim is:

1. An electric cell comprising a container, a sheet consisting essentially of silver chloride and dividing said container into two compartments, a first aqueous electrolyte comprising hydrochloric acid and contained in one of said compartments, a second aqueous electrolyte comprising hydrofluoric acid, ferrous chloride and ferric chloride and contained in the other of said compartments, and first and second inert electrodes contacting said first and second electrolytes respectively, said silver chloride sheet having a thickness such that said sheet is substantially impermeable to the ions in said first and second electrolytes and said cell being chargeable by exposure of the surface of said sheet adjoining said first electrolyte to radiant energy capable of decomposing silver chloride.

2. An electric cell according to claim 1, wherein at least a portion of said container is transmissive of said radiant energy and wherein at least one of said electrodes is constructed and arranged so as to permit radiant energy entering said cell through said transmissive portion to impinge on said sheet.

3. An electric cell comprising a container, a sheet consisting essentially of silver chloride having silver bromide and silver ioide coated on at least one surface thereof and dividing the interior of said container into two compartments, a first aqueous electrolyte comprising hydrochloric acid and contained in the one of said compartments bounded by said one coated surface, a second aqueous electrolyte comprising cuprous chloride and hydrochloric acid and contained in the outer of said compartments, and first and second inert electrodes contacting said first and second electrolytes respectively, said sheet having a thickness such that it is substantially impermeable to the ions in said first and second electrolytes and said cell being chargeable by exposure of said one surface of said sheet adjoining said first electrolyte to radiant energy capable of decomposing silver chloride, silver bromide and silver iodide in said sheet.

4. An electric cell according to claim 3, wherein at least a portion of said container bounding said first compartment is transmissive of said radiant energy and wherein one of said electrodes is constructed and arranged to permit radiant energy entering said cell through said transmissive portion to impinge on said one surface of said sheet.

5. An electric cell comprising a container, a cation-exchange membrane impregnated with silver iodide and silver bromide and dividing the interior of said container into two compartments, a first aqueous electrolyte comprising hydrochloric acid and contained in one of said compartments, a second aqueous electrolyte comprising silver, ferrous, ferric and hydrogen cations and dodecyl benzene sulfonate anions having ionic radii in excess of the pore radii of said membrane, and contained in the other of said compartments, and first and second inert electrodes contacting said first and second electrolytes respectively, said membrane being substantially impermeable to the ions in said two electrolytes and said cell being chargeable by exposure of the surface of said membrane adjoining said first electrolyte to radiant energy capable of decomposing silver iodide and silver bromide in said membrane.

6. An electric cell according to claim 5, wherein at least a portion of said container bounding said one compartment is transmissive of said radiant energy and wherein said first inert electrode is constructed and arranged to permit radiant energy entering said cell through said transmissive portion to impinge on said surface of said membrane.

7. An electric cell comprising a first electrolyte containing hydrochloric acid, a second electrolyte containing hydrochloric acid and cuprous chloride, a sheet contacting and separating said first and second electrolytes, said sheet being composed of at least one silver halide selected from the group consisting of silver chloride, silver bromide and silver iodide, and first and second inert electrodes respectively contacting said first and second electrolytes, said sheet having a thickness such that it is substantially impermeable to the ions of said first and second electrolytes and said cell being chargeable by exposure of the surface of said sheet adjoining said first electrolyte to radiant energy capable of decomposing said silver halide in said sheet.

8. A cell according to claim 3, wherein said hydrochloric acid in said first electrolyte initially has a concentration of about one molar, said hydrochloric acid in said second electrolyte initially has a concentration of about one molar, and said second electrolyte initially is saturated with cuprous chloride.

9. An electric cell chargeable by radiant energy, said cell comprising a first electrolyte containing hydrochloric acid, a second electrolyte containing one combination of substances selected from the group of combinations consisting of hydrofluoric acid, ferrous chloride and ferric chloride, hydrochloric acid and cuprous chloride, and ferrous, ferric, silver, hydrogen, sulfate and dodecyl benzene sulfonate ions, charge-conductive means substantially impermeable to the ions in said two electrolytes and separating said electrolytes from each other, said means comprising at least one silver halide selected from the class consisting of silver chloride, silver bromide and silver iodide, and first and second inert electrodes respectively immersed in said first and second electrolytes, said cell being chargeable by exposure of the surface of said means adjoining said first electrolyte to radiant energy capable of decomposing said silver halide comprised in said means.

10. An electric cell according to claim 9, wherein said cell additionally comprises a container for said electrolytes, at least a portion of said container being transmissive of said radiant energy and said first electrode being constructed and arranged so as to permit radiant energy entering said cell through said transmissive portion to impinge on the surface of said charge-conductive means adjoining said first electrolyte.

References Cited in the file of this patent

UNITED STATES PATENTS

| | | |
|---|---|---|
| Re. 11,238 | Roberts | Apr. 26, 1892 |
| 870,973 | Little | Nov. 12, 1907 |
| 1,148,936 | Stille | Aug. 3, 1915 |
| 2,694,742 | Harding | Nov. 16, 1954 |
| 2,700,063 | Manecke | Jan. 18, 1955 |
| 2,870,344 | Brattain et al. | Jan. 20, 1959 |

FOREIGN PATENTS

| | | |
|---|---|---|
| 759,561 | France | Nov. 23, 1933 |

OTHER REFERENCES

Journal of Physical Chemistry, vol. 33, 1929, pp. 331–353.